United States Patent [19]
Genesi

[11] 4,085,411
[45] Apr. 18, 1978

[54] LIGHT DETECTOR SYSTEM WITH PHOTO DIODE AND CURRENT-MIRROR AMPLIFIER

[75] Inventor: Robert Charles Genesi, Sterling, Mass.

[73] Assignee: Sprague Electric Company, North Adams, Mass.

[21] Appl. No.: 677,573

[22] Filed: Apr. 16, 1976

[51] Int. Cl.² .................... G03B 7/08; H01J 39/12; H01L 29/72
[52] U.S. Cl. ............................ 354/51; 250/214 P; 307/297; 307/311; 357/36
[58] Field of Search ............. 307/297, 311, 315; 356/223; 357/36; 250/214 P, 214 RC; 354/50, 51, 60 E, 60 R

[56] References Cited
U.S. PATENT DOCUMENTS

| | | | |
|---|---|---|---|
| 3,393,604 | 7/1968 | Lundin | 354/32 X |
| 3,418,592 | 12/1968 | Solomon et al. | 357/36 UX |
| 3,424,908 | 1/1969 | Sitter | 307/311 X |
| 3,588,672 | 6/1971 | Wilson | 307/297 X |
| 3,626,825 | 12/1971 | Years | 354/60 R X |
| 3,779,142 | 12/1973 | Yata et al. | 354/32 X |
| 3,808,463 | 4/1974 | Mulder | 354/43 X |
| 3,925,718 | 12/1975 | Wittlinger | 307/297 X |

Primary Examiner—L. T. Hix
Assistant Examiner—M. L. Gellner
Attorney, Agent, or Firm—Connolly and Hutz

[57] ABSTRACT

A light detector system includes a photo-diode being connected to an integrated circuit that includes a current-mirror amplifier. The current-mirror amplifier has a stable gain even down to the very low input currents that may be generated by a silicon photo-diode that is exposed to low levels of light intensity. The integrated circuit may also include the photo-diode itself as well as other circuitry for use in controlling the shutter speed of a camera to automatically provide the proper photographic film exposure.

16 Claims, 8 Drawing Figures

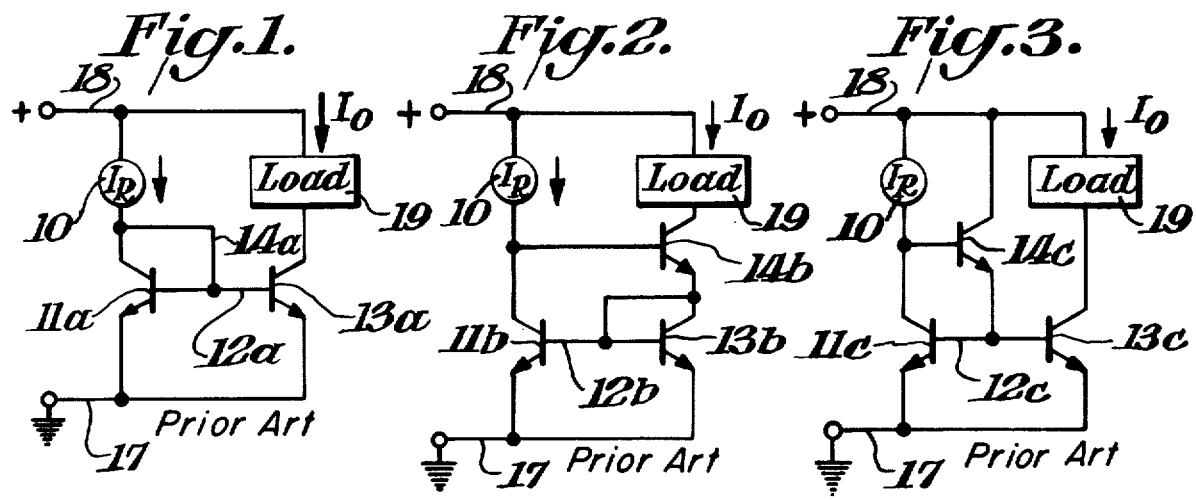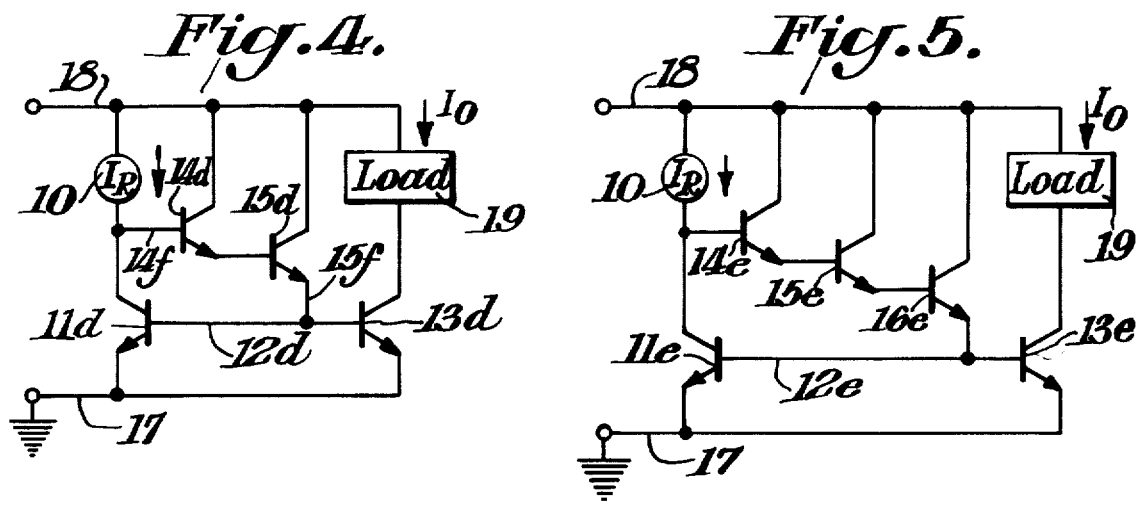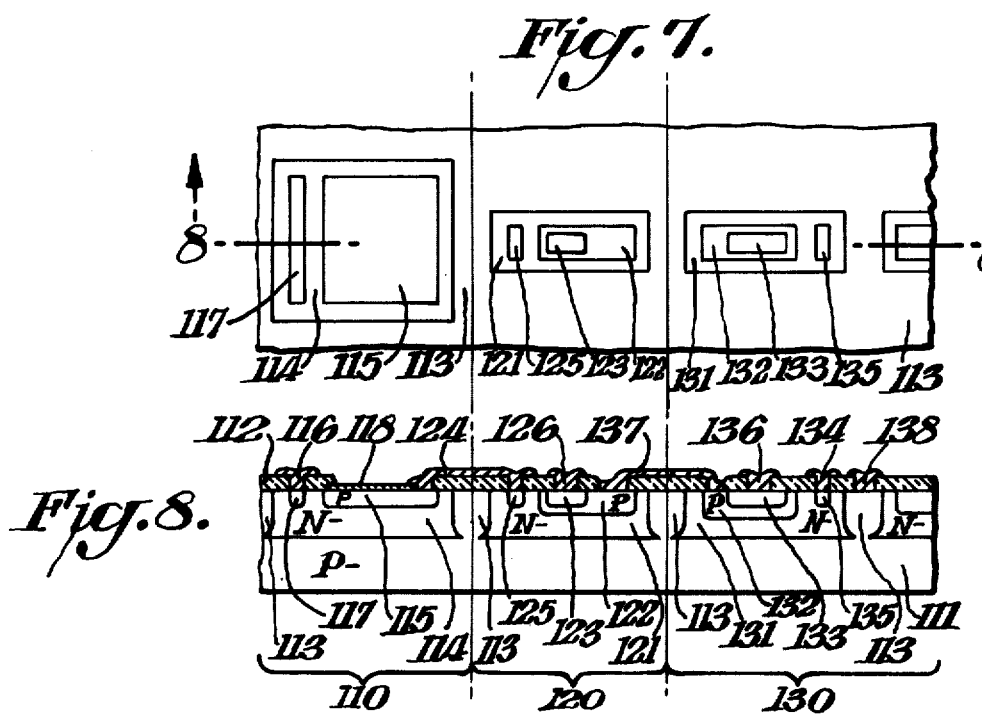

LIGHT DETECTOR SYSTEM WITH PHOTO DIODE AND CURRENT-MIRROR AMPLIFIER

BACKGROUND OF THE INVENTION

This invention relates to a light detector system and more particularly to a light detector system including a photo-diode and a current-mirror amplifier.

The sensing of light intensity by means of photo-diodes normally requires the use of an amplifier to enlarge the very small photo-diode signals to usable levels. Amplification is especially necessary when silicon photo-diodes are used. Photo-diode transducers are normally operated in a reverse voltage bias mode and generate a current that is a function of the intensity of light illuminating the photo-diode junction. Silicon photo-diodes are characterized as having a sensitivity, namely the ratio of output current to incident light intensity, that over a wide range of light intensities is much more linear but much smaller than the sensitivity of the more commonly employed photo-diodes made of cadmium sulphide or of III–V semiconductor compounds. Also, silicon photo-diodes are capable of being mass produced with much greater uniformity, reproducibility, and predictability of characteristics compared with the aforementioned high gain photo-diodes. The relatively low gain silicon diode almost always requires the use of an amplifier in practical light sensing applications.

It is known to use an FET type operational integrated circuit amplifier in conjunction with a photo-diode for determining appropriate shutter speed and aperture openings in cameras. It is also known to make a light summing system using a standard Miller integrating circuit by connecting the photo-diode in parallel with the Miller feed-back capacitor around the FET amplifier in a camera light monitoring system.

Conventional photo-diode amplifiers exhibit non-linear gains at the very low input signal levels generated by silicon photo-diodes operating in a low ambient light level. This is particularly true of bipolar operational amplifiers that are characterized as having an input offset current that makes them unsuitable for providing reliable and constant gain of such small signals.

In addition, FET integrated amplifiers generally require substantially more semiconductor surface area, or real-estate, than for a comparable integrated bipolar amplifier; so for economy the latter is preferred. When it is considered that to include a silicon photo-diode on the same semiconductor chip with an associated integrated circuit amplifier would provide further economy, it is found that combinations of separate elements of the old art do not offer of suggest practical low cost solutions.

It is accordingly an object of the present invention to overcome the aforementioned shortcomings of the prior art.

It is another object of the present invention to provide a simple bipolar semiconductor integrator for use with a silicon photo-diode.

It is another object of the present invention to provide a low cost integrated circuit light detector system including a silicon photo-diode and an amplifier for effectively sensing light intensity over several orders of magnitude.

It is yet a further object of this invention to provide an integrated circuit including a photo-diode and an amplifier for use in automatically controlling light exposure in a camera.

SUMMARY OF THE INVENTION

A light detector system comprises a photo-diode and a current-mirror amplifier circuit. The current-mirror circuit serves as an amplifier and has at least one current-mirror stage. This stage is minimally comprised of a semiconductor input device and a bipolar output transistor. The input device has at least one p-n junction that is connected in parallel with the base-emitter junction of the output transistor and in the same polarity. The photo-diode is connected between one terminal of a d.c. power supply and the input device. The emitter of the output transistor is connected to the other terminal of the d.c. power supply. When the input device is a diode, the connection from the photo-diode is made directly to the junction of the input device to which the base of the output transistor is connected. When the input device is a transistor, the junction of the input device is the base-emitter junction thereof and the connection from the photo-diode is to the collector of this input transistor. A circuit connection is made between the collector of the output transistor, usually through a load, to the above said one terminal of the d.c. power supply. An amplified photo current flows from the collector through this connection including the load.

When the input device is a transistor, a third bipolar transistor may be connected with the base to the collector of the input transistor, with the emitter to the base of the input transistor and with the collector to the above said one terminal of the d.c. power supply. This three transistor stage provides improved current gain stability especially for very low input currents from the photo-diode.

Even further improvement may be realized in gain stability at low signal levels by substituting a Darlington group of transistors for the third transistor described above.

For low or even moderate light levels the photo-diode generates a low current, and the currents caused to flow in the amplifier are in the low region for which the current gain of the transistors, particularly of the first stage, is subnormal and typically less than 10. The above described current-mirror stages having a Darlington group have the property that the ratio of the load current to photo-diode input current remains almost constant for transistor current gains greater than about 5 and thus are capable of providing essentially linear amplification over more than three orders of magnitude of light intensity including the lowest light level of practical interest, e.g. $50 \times 10^{-12}$ amperes. The base-emitter junction of the output transistor is preferably larger in area than that of the input device to provide a current gain in the current-mirror stage that is greater than 1.0. Additional current-mirror stages, each stage preferably having a current gain greater than 1.0, may be added in tandem such that the total current gain of the amplifier is the product of the gains of the individual stages. The output of the last or only stage has a high characteristic output impedance that is inherently suitable for loading with a current integrating capacitor. The gain stability is achieved without the need for any overall amplifier feedback. This all bipolar amplifier is formed of bipolar transistors made by well established high yield methods and occupies substantially less silicon substrate area than a conventional FET amplifier of equivalent performance.

No offset currents or voltages are involved as must be accounted for in a standard operational amplifier. No bias circuits are required and the only currents flowing anywhere in the amplifier circuit are signal currents. Thus, power supply drain is very low and in fact essentially no current flows in the amplifier at all when the photo-diode is not illuminated, making this circuit particularly suitable for use in a battery operated light sensor for a camera. Also, the stable gain and high sensitivity of this current-mirror amplifier even at extremely low input current levels makes it possible to use small low cost but temperature stable silicon photo-diodes.

Furthermore, in addition to the combination of the above noted highly advantageous features of this photo-diode amplifier, there is provided a large signal in the output stage that is proportional to the light intensity being sensed at any particular instant by the photo-diode. This large signal is available for metering or otherwise indicating the light intensity. This feature is not available in a standard Miller integrator type photo-diode amplifier. This large light-proportional signal may also be used to provide a predetermined compensation for camera shutter delays in an automatic light sensing and shutter time adjusting camera employing the circuit of this invention.

Additionally, in the circuit of this invention a fixed current of predetermined value may be directly and simply connected to charge the integrating capacitor in parallel with the charging current from the output of the current-mirror amplifier when the camera is to be operated in the flash mode, which is not practical when using a standard Miller integrating circuit.

BRIEF DESCRIPTION OF THE DRAWINGS

FIGS. 1 and 2 each show a well known current-mirror circuit that may be used in a system of this invention.

FIG. 3 shows another current-mirror circuit that is known that may be used in a system of this invention.

FIGS. 4 and 5 each show a current-mirror circuit of this invention having a stable gain down to very low levels of input current.

FIG. 7 shows a top view of a portion of a silicon integrated circuit of this invention. The passivating layer and the conductive metal interconnections are omitted in this view.

FIG. 8 shows a side sectional view of the integrated circuit portion shown in FIG. 7, taken in plane 8—8.

DESCRIPTION OF THE PREFERRED EMBODIMENT

Figure 6:
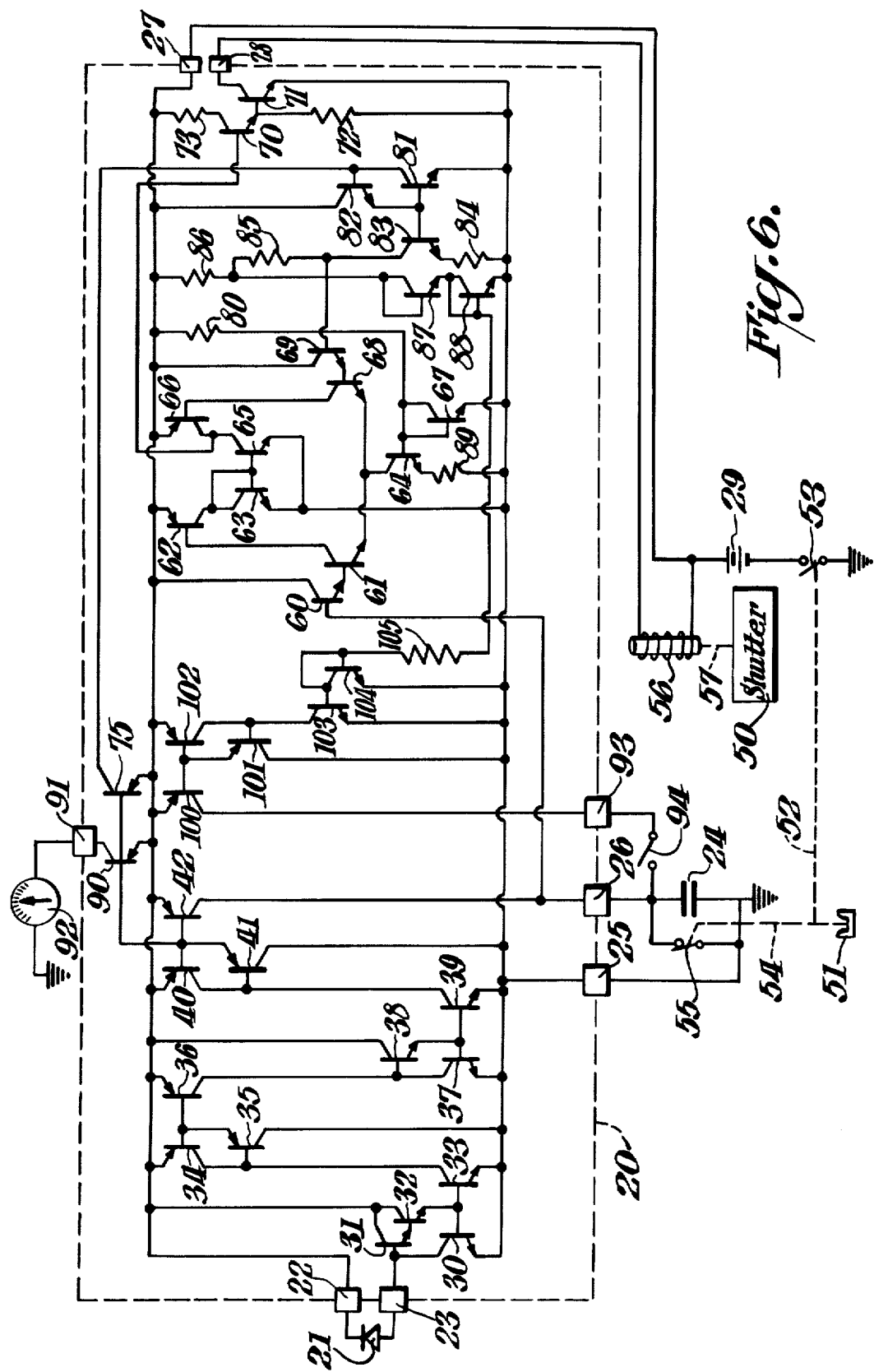
FIG. 6 shows a circuit diagram of a light detection system of this invention.

Two well known and widely used current-mirror circuits are shown in FIGS. 1 and 2. A less commonly known current-mirror circuit is shown in FIG. 3. Since the basic construction and operation of current-mirrors is well known, only a brief description of the typical circuits in FIGS. 1, 2 and 3 among known current-mirror circuits is presented here. Typical current-mirror circuits and their uses are described in U.S. Pat. No. 3,588,672 to G. R. Wilson issued June 28, 1971, and the paper, The Monolithic Op Amp: A Tutorial Study by J. E. Solomon, IEEE Journal of Solid-State Circuits, Vol. SC9, No. 6, December 1974, pp 314–332. Current-mirror circuits have heretofore been used extensively to provide constant current sources, bias sources with high source impedances or as balancing loads in differential amplifiers, all such uses being illustrated in the above noted publications.

Generally, a current-mirror circuit has two transistors such as 11 and 13 in FIGS. 1 through 5 that have a common base connection 12 and emitters connected to a ground bus 17 (or another common reference point). A current source 10 is shown connected in series collector to emitter with transistor 11, while a load impedance 19 is shown connected in series; collector to emitter, with transistor 13. These two series circuits are each connected across a d.c. power supply, that is between the negative and positive busses 17 and 18, respectively.

In FIG. 1, a conductor 14a connects the base to the collector of transistor 11a forming a diode. In FIG. 2, a feedback transistor 14b is connected collector to emitter in series with the load 19. In FIG. 3, a feedback transistor 14c provides gain between the collector and base of transistor 11c. In all of these circuits, the magnitude of the load or output current Io is normally proportional to the magnitude of the reference current Ir from the current source 10.

In FIG. 4 the feedback is provided by two Darlington connected transistor 14d and 15d having the free base 14f connected to the collector of transistor 11d and the free emitter 15f connected to the mutually coupled bases of transistors 11d and 13d. In FIG. 5 the feedback is provided by a Darlington group of three transistors 14e, 15e and 16e.

As has been noted, a photo-diode amplifier should ideally be capable of providing a constant current gain even for low light levels and therefore low input current levels at which bipolar transistors tend to have greatly diminished $\beta$'s. In Table I there are provided analytical expressions for the ratio of output current Io to input current Ir for each of the five circuits in FIGS. 1 through 5, having been derived in a manner similar to that described in the above-noted patent to Wilson.

TABLE I

| Current-Mirror Circuits | Ratio of $\frac{I_o}{I_r}$ | Value of $\frac{I_o}{I_r}$ for $\beta = 100$ | $\beta = 5$ |
|---|---|---|---|
| FIG. 1 | $\frac{\beta}{2 + \beta}$ | .98 | .714 |
| FIG. 2 | $\frac{\beta(\beta + 2)}{\beta(\beta + 2) + 2}$ | 1.000 | .946 |
| FIG. 3 | $\frac{\beta(\beta + 1)}{\beta(\beta + 1) + 2}$ | 1.000 | .937 |
| FIG. 4 | $\frac{\beta(\beta + 1)^2}{\beta(\beta + 1)^2 + 2}$ | 1.000 | .989 |
| FIG. 5 | $\frac{\beta(\beta + 1)^3}{\beta(\beta + 1)^3 + 2}$ | 1.000 | .998 |

The current gains of these five circuits are shown to have various dependencies upon transistor current gain, only the circuits of FIGS. 4 and 5 having a nearly constant gain for transistor $\beta$'s as low as 5.

The gain expressions in Table I are derived assuming identical transistors in each circuit. It is known that in current-mirror type circuits the two transistors having their base-emitter junctions in parallel (11 and 13) may have base-emitter junction areas, $A_{11}$ and $A_{13}$ that are not equal, and that under large signal conditions the gain $$G = I_o/I_r = A_{13}/A_{11}.$$

The expressions for gain as a function of $\beta$ given above are then appropriately modified by multiplying by this ratio $A_{13}/A_{11}$ in each case and the relative merits of the circuits remain unchanged. It can now be appreciated that the current-mirror circuits of FIGS. 4 and 5 are preferred for providing linear amplification of the currents generated by a linear but low gain silicon photo-diode. It is also noted that the total current drawn from the power supply at any given time is equal to only about $I_r(1+G)$ for any of the current-mirror circuits which, as will be seen, makes it possible to provide a photo-diode current amplifier of cascaded current-mirror circuits that draw very small currents from the d.c. supply.

In a first preferred embodiment of this invention an integrated circuit, shown in FIG. 6 is formed in a silicon crystal body diagramatically enclosed by the dashed line 20. A silicon photo-diode 21 is connected to the input terminals 22 and 23 of the integrated circuit 20. A 0.1 microfarad metallized mylar film capacitor 24 is connected to terminals 25 and 26. A d.c. power supply 29 may be connected with the positive side at terminal 27 and the negative side at terminal 25, the latter serving as the circuit ground reference terminal.

The current generated by the photo-diode 21 is applied in series with the first, or input, transistor 30 of the first current-mirror stage. Two Darlington connected transistors 31 and 32 form a high gain feedback connection between the collector and the base of the first transistor 30. The output transistor 33 has a base-emitter junction area three times that of the first transistor 30 providing the first current-mirror stage with a current gain of 3.

The following three cascaded current-mirror stages are comprised of transistors 34 through 42, and each stage employs only one transistor in the feedback connection, e.g. transistor 35 in the second current-mirror stage. The gains of these three following stages are designed to be 2, 3 and 2 respectively so that the overall current gain of this four stage current-mirror amplifier is 36.

Note that the polarity type of the transistors of each stage is opposite to that of the adjacent stages in this tandem stage amplifier. Any two adjacent of the tandem stages are interconnected by having the output transistor of a first of the two stages connected collector-to-emitter between the input device of the other of the two stages and one of the power supply terminals, forming a series circuit wherein the output transistor of the first stage and the p-n junctions of the input device of the second stage are series connected between the two power supply terminals.

The silicon photo-diode employed has an effective P-N junction area of about 0.070 inch by 0.093 inch and when reverse biased generates 27.3 nanoamps at 0.78 foot candle light intensity to 3.5 microamps at 100 foot candles. The current-mirror amplifier has a current gain that is linear within 5% over the broader range of 0.1 foot candle to 200 foot candles. Furthermore, the amplifier gain is substantially independent of supply voltage variations from 2.0 volts to 3.6 volts.

It is estimated that photo-diode currents well below $50 \times 10^{-12}$ amperes could be provided linear amplification by a current-mirror circuit of the types shown in FIGS. 4 and 5. The lowest photo-diode currents, for which a current-mirror amplifier of this invention remains capable of providing essentially linear amplification, is not known. It is determined approximately and primarily by the lowest base emitter current at the input transistor for which the gain $\beta$ of that transistor is greater than about 2. The direct amplification of signal currents of such very low levels by conventional class A amplifiers of comparable stability, linearity, size or cost is believed to be unattainable.

A standard Schmitt trigger circuit comprising transistors 60 through 69 has an input at the base of transistor 60 connected to the terminal 26. A reference voltage is supplied to the base of transistor 69 and thus transistors 69, 68 and 66 are normally conducting. When the voltage of the charging capacitor 24 reaches a predetermined threshold voltage $V_s$, nominally 1.4 volts in this case, the Schmitt trigger circuit changes state and produces a negative going output signal at the collector of transistor 65. This signal turns off the power amplifier stage comprised of transistors 70 and 71 that is connected via terminals 27 and 28 to a camera shutter solenoid 56.

The circuit of FIG. 6 is designed for use in a camera to provide an automatic light sensing and shutter speed adjustment feature. The camera employs a spring loaded leaf type shutter 50 that is normally closed. A shutter trigger button 51 has a mechanical coupling 52 with a normally open switch 53 so that when the button 51 is pressed, switch 53 closes connecting the battery 29 to the integrated circuit 20. The trigger button 51 also is connected by a mechanical coupling 54 to a normally closed switch 55 so that the capacitor 24 with which it is in parallel has zero accumulated charge until the button is pressed and switch 55 opens. At this instant the amplified photo current from the collector of transistor 42 begins to charge capacitor 24. Also at this instant the Schmitt trigger circuit assumes its normal steady state condition with transistors 66, 68 and 69 conducting which has the effect of turning on the output transistors 70 and 71. Thus a current is caused to flow in the solenoid 56 and the shutter 50 being coupled to the solenoid by means of a linkage 57 opens at about the instant the button 51 is actuated.

Now the capacitor charges at a rate depending upon the amount of light illuminating the photo-diode 21 and when the capacitor voltage reaches $V_s$, the Schmitt trigger circuit switches states shutting off transistors 70 and 71 and thus removing power to the solenoid and closing the shutter.

It can therefore be seen that the length of time the shutter is open is determined by the length of time required to charge the capacitor 24 to the trigger threshold voltage, $V_s$ of the Schmitt trigger circuit. And, the length of time required to charge the capacitor to $V_s$ is determined by the magnitude of the incident light. Thus, a real-time or dynamic adjustment of shutter "speed" is provided by the circuit of this invention to insure proper exposure of the camera film. Specifically in this first preferred embodiment the shutter "speed" is about ⅛ second and about 1/1000 second for incident light intensities of 0.78 foot-candle and 100 foot candles, respectively.

It will now be appreciated that the integrating time in the above circuit for a given light intensity is fixed and is suitable for providing the proper exposure of a photographic film of a given "film speed". Films having other "film speeds" may be readily accommodated by switching in alternate values of capacity 24 (not shown) or changing the gain of the current-mirror amplifier whereby for instance alternate transistors to transistor 42 having different emitter-base junction areas may become activated by a switching means (not shown).

Mechanical shutters have a finite time of response both at opening and at closing. The particular leaf shutter that is used in the camera system mentioned above, exhibits a delay of about 2 milliseconds between the time of the initial pressing of the shutter trigger button and the time at which the shutter becomes fully open. The shutter also exhibits a delay of about 3 milliseconds between the initiation of a negative going output signal at terminals 27 and 28 to the solenoid, and the time at which the shutter becomes fully closed. These delays are of little consequence when the intensity of the incident light is moderate or low and the time required to charge the capacitor to $V_s$ is long in comparison with these mechanical shutter response times. But, under conditions of high light intensity, the time required to charge the capacitor $V_s$ becomes very short and commensurate with the shutter response times.

A simple and effective method for compensating for the shutter response times is made possible in the current-mirror photo-diode integrating circuit of this invention. Unlike in a conventional Miller integrator, the current-mirror amplifier produces a signal in the final amplifier stage that is an amplified replica of the integrator input or photo-diode current.

Thus, a large electrical signal that is at all times proportional to the incident light intensity is available as for example the collector current in transistor 42. In the circuit of FIG. 6, the PNP buffer transistor 75 has a common emitter connection and a common base connection with the output transistor 42 of the fourth stage of the integrator current-mirror amplifier. Transistors 75 and 42 have the same emitter base junction areas so that the magnitudes of the currents in the collectors of each of transistors 75 and 42 are equal at any instant of time.

The collector current of transistor 75 becomes the input current to a non-linear amplifier circuit including transistors 81, 82 and 83. The input current to output voltage transfer characteristic of this non-linear amplifier circuit is designed to be approximately logrithmic. That is, the output reference voltage appearing at the collector of transistor 83 remains essentially unchanged for a wide range of low value currents in the collector of transistor 75, which corresponds to the situation wherein moderate to low levels of light are present. However, for high light intensity levels and correspondingly high levels of current in the collector of transistor 75, the voltage at the collector of transistor 83 decreases. In this instance, since this voltage serves as the aforementioned reference voltage for the Schmitt trigger circuit, the threshold voltage $V_s$ is reduced. In this embodiment, the adjusted values of $V_s$ are 1.4, 1.2 and 1.0 volts corresponding to incident light intensities of 0.78, 50 and 100 foot candles, respectively. Consequently, for high levels of light intensity the Schmitt trigger circuit triggers sooner than normal to compensate in a predetermined manner for the then significant shutter-closing delay time.

The fact that the current-mirror photo-diode integrating circuit of this invention inherently provides a large electrical signal proportional to incident light intensity also makes it possible to very simply meter the light intensity. The PNP transistor 90, in a similar fashion to transistor 75, is connected with the base to emitter in parallel with the base and emitter of output transistor 42. The collector of transistor 90 is connected to terminal 91. Now it is only necessary to connect an external ammeter 92 between terminal 91 and ground (terminal 25) to meter the light intensity at any instant of time. This metering capability is present whether switch 55 is open or closed. This feature is not available in a conventional Miller integrator. It may be desirable when using this feature to provide a special means (not shown) to apply power to the amplifier such as by closing switch 53 while preventing exposure of the film.

It will be recognized that the circuit and camera system so far described is also capable of automatic exposure adjust operation in the flash mode wherein the ambient light level is normally low. That is, using a standard flash attachment with the camera, the actuation of the shutter trigger button causes the shutter to open and a flash lamp (not shown) to illuminate the subject to be photographed. The photo-diode will sense the flash of light illuminating the subject plus any ambient light, and the dynamic current-mirror integrator and associated circuitry would be expected to close the shutter at the proper time to provide the correct film exposure.

However, in the situation wherein the background of the subject to be photographed is dark and non-reflective, the flash bulb will illuminate the subject but the background will remain dark. Since the photo-diode light sensor will generally detect the average light intensity framed by the camera view finder, the image of the subject will tend to become over exposed.

Therefore, a current source, of about 1.0 microamperes in this example, is provided in the integrated circuit through terminal 93 to the capacitor 24 through switch 94, in order to insure in the flash mode the closing of the shutter at least within a predetermined fixed time and to prevent the aforesaid over-exposure of subjects in a dark non-reflective environment. The normally open switch 94 is closed only when the camera is placed in the flash mode. The integrated current-source circuit comprises transistors 100 through 104, a reference voltage therefor being supplied from the network comprised of diodes 87 and 88 and resistors 85 and 86. Thus, in the extreme limit, with no ambient light, with no capacitor charging current from transistor 42 and with the camera set in the flash mode and switch 94 closed, then the 1 microampere of current from transistor 100 charges the capacitor to the Schmitt circuit threshold voltage $V_s$ of about 1.4 volts in 140 milliseconds and the shutter is closed.

On the other hand, if the background is light and/or reflective, the normal average illumination in the flash mode is on the order of 6 foot candles and the corresponding average charge current from the current-mirror amplifier is on the order of 80 microamps. Thus the 1 microamp from the current source is comparatively insignificant and the dynamic shutter speed adjust feature is essentially unaffected during such a normal flash operation.

In a conventional Miller integrator the charging capacitor is connected from the input to the output of an operational amplifier, with a live signal present at both capacitor terminals. On the other hand, the integrating capacitor of the circuit of this invention advantageously has one terminal connected to a signal ground point. The compensating feature just described, employing a capacitor charging current-source in the flash mode to compensate for dark backgrounds, is therefore easily implemented in combination with the current-mirror integrator of the present invention but is not easily implemented or practical in combination with the standard Miller circuit.

In the construction of the integrated circuit of FIG. 6 the key ratios of base-emitter junction areas of various transistor groups and nominal values of the integrated resistors are given in Table II.

TABLE II

| Transistors | Base-Emitter Area Ratios |
| --- | --- |
| 30/31/32/33 | 1/1/1/3 |
| 34/35/36 | 1/1/2 |
| 37/38/39 | 1/1/3 |
| 40/41/42/75/90 | 1/1/2/2/2 |
| 81/82/83 | 1/1/2 |
| 88/104/103 | 1/2/1 |
| 102/101/100 | 2/1/1 |

| Resistors | Value (ohms) |
| --- | --- |
| 72 | 2.0K |
| 73 | 0.5K |
| 80 | 5.1K |
| 84 | 2.4K |
| 85 | 12.0K |
| 86 | 1.0K |
| 89 | 4.6K |
| 105 | 12.0K |

The integrated circuit of FIG. 6 is constructed on a silicon wafer having the dimensions of 0.051 by 0.039 inch. A thinner than normal epitaxial layer was employed, namely about 7.4 microns, and transistors 35 and 41 are of a standard vertical construction and advantageously have a greater than usual current gain for such vertical PNP's. The epitaxial layer has a conductivity of about 1.0 ohm centimeters. All other transistors are standard planar types as illustrated in FIGS. 7 and 8.

In FIGS. 7 and 8 there is shown a portion of an integrated circuit illustrating a second preferred embodiment of the invention that includes a photo-diode 110 and the input and output transistors 120 and 130 of a current-mirror amplifier stage to which the photo-diode 110 is connected. The substrate is a lightly doped P type silicon crystal 111. A passivating silicon oxide layer 112 covers the top surface of the substrate. Heavily doped P+ walls 113 completely isolate the N− pockets 114, 121 and 131.

A shallow P doped anode region 115 is formed in the N− pocket 114 forming a photo-diode junction therewith. A metal contact 116 makes contact to the N− pocket 114 through a heavily doped N+ contact plug 117. A thin light-transparent layer of silicon oxide 118 protects the substrate surface overlying the photo-diode junction.

The input transistor 120 has a P doped base region 122 and a N+ doped emitter region 123 formed in the N− pocket 121 which serves as the collector. A metal conductor 124 connects the P doped anode 115 of the photo-diode to the collector 121 of the input transistor through the N+ plug 125. A metal contact 126 makes contact to the emitter region 123.

The output transistor 130 has a base region 132 and an emitter region 133 formed in the N− pocket 131 which serves as the collector. A metal contact 134 makes contact with the collector 131 through an N+ plug 135. A metal contact 136 makes contact to the emitter 133. A metal conductor 137 connects the bases of the input and output transistors. A metal contact 138 makes ohmic connection to the P substrate and is normally tied to the circuit ground point to provide a reverse bias voltage across the N− pockets and the substrate for isolation. The base emitter junction of the output transistor 130 is larger than than of the input transistor which makes the current gain of this current-mirror stage greater than 1.0.

What is claimed is:

1. A light detector system comprising a silicon photo-diode and a semiconductor integrated current-mirror circuit to provide amplification of the photo current generated by said photo-diode, said current-mirror amplifier circuit having at least one stage comprising a pair of d.c. power supply terminals, a bipolar output transistor and a bipolar input device having at least one p-n junction, said photo-diode being directly connected between said input device and one of said power supply terminals forming a series circuit wherein said photo-diode and said p-n junction are series connected with opposite polarities between said power supply terminals, the emitter of said output transistor being connected to the other of said power supply terminals, the base-emitter junction of said output transistor being directly connected in parallel with said at least one junction of said input device and in the same polarity, the area of said base-emitter junction of said output transistor being greater than the area of said at least one junction of said input device to provide a current gain in said at least one stage greater than 1.0, a circuit connection being made between the collector of said output transistor and said one terminal of said d.c. power supply to provide a path through which said amplified photo current will flow.

2. The light detector system of claim 1 wherein said input device of said amplifier stage is a diode.

3. The light detector system of claim 1 wherein said input device is a bipolar transistor and said at least one junction thereof is the base-emitter junction, said photo-diode connection to said input device being a connection to the collector of said input transistor.

4. The light detector system of claim 3 additionally comprising a third bipolar transistor of the same polarity type as said input and output transistors, the base of said third transistor being connected to said collector of said input transistor, the emitter of said third transistor being connected to the base of said input transistor and the collector of said third transistor being connected to said one d.c. power supply terminal.

5. The light detector system of claim 3 additionally comprising at least two other transistors, of the same polarity type as said input and output transistors being interconnected in a standard Darlington group, the free base of said Darlington group being connected to said collector of said input transistor, the free emitter of said Darlington group being connected to said base of said input transistor and the collectors of said Darlington group being connected to said one d.c. power supply terminal, all of said transistors of said at least one stage being of the same polarity type.

6. The light detector system of claim 3 additionally comprising a third bipolar transistor of the same polarity type as said output transistor, the base of said third transistor being connected to said collector of said input transistor, the emitter of said third transistor being connected to the base of said input transistor, and, the base and collector of said output transistor being connected together, said circuit connection between said output transistor and said one terminal including a connection between the collector of said third transistor and said one terminal.

7. The light detector system of claim 1 wherein said current-mirror amplifier has a plurality of current-mirror stages including said at least one stage, all said stages being connected in tandem, the transistors comprising each said stage being of the same polarity type, the polarity type of the transistors of each said stage being opposite to that of the adjacent of said stages.

8. The light detector system of claim 1 additionally comprising a capacitor being connected to and being adapted to be charged by the output of said current-mirror amplifier to provide a voltage across said capacitor that is a function of the sum of the light having been incident upon said photo-diode over an interval of time.

9. The light detector system of claim 8 additionally comprising a voltage threshold detection circuit that produces an output signal when the voltage applied to the input thereof exceeds a predetermined threshold value, said capacitor being connected to said input of said threshold detection circuit.

10. The light detector system of claim 8 additionally comprising a camera shutter, and a shutter actuating means that is connected to the output of said threshold detection circuit for the purpose of opening said shutter during said charging of said capacitor and closing said shutter in response to said output signal from said threshold detection circuit.

11. The light detector system of claim 8 additionally comprising a bipolar buffer transistor having a base-emitter junction connected in parallel and in the same polarity with that of the output transistor of one of said current-mirror stages, the collector of said buffer transistor being connected to a network having a logrythmic transfer function, the output of said network being connected to serve as the reference voltage by which said threshold voltage of said threshold detector circuit is predetermined.

12. The light detector of claim 8 additionally comprising a constant current source that is connected to charge said capacitor in parallel with the charging current from said output of said current-mirror circuit.

13. The light detector of claim 8 wherein said current-mirror amplifier is an integrated circuit formed in a silicon crystal.

14. The light detector of claim 8 wherein said current-mirror amplifier and said photo-diode are both formed in a single silicon crystal.

15. The light detector system of claim 1 additionally comprising a bipolar buffer transistor having a base-emitter junction connected in parallel with and in the same polarity to that of the output transistor of one of said current-mirror stages, the collector of said buffer transistor being connected to an ammeter for the purpose of indicating the intensity of light that is incident upon said photo-diode.

16. The light detector system of claim 1 wherein said photo-diode characteristically generates a current of about 3.5 microamperes at 100 foot candles and wherein said current mirror amplifier provides essentially linear amplification over a range of light intensities extending as low as 0.1 foot candles.

* * * * *